United States Patent Office 2,960,692
Patented Nov. 15, 1960

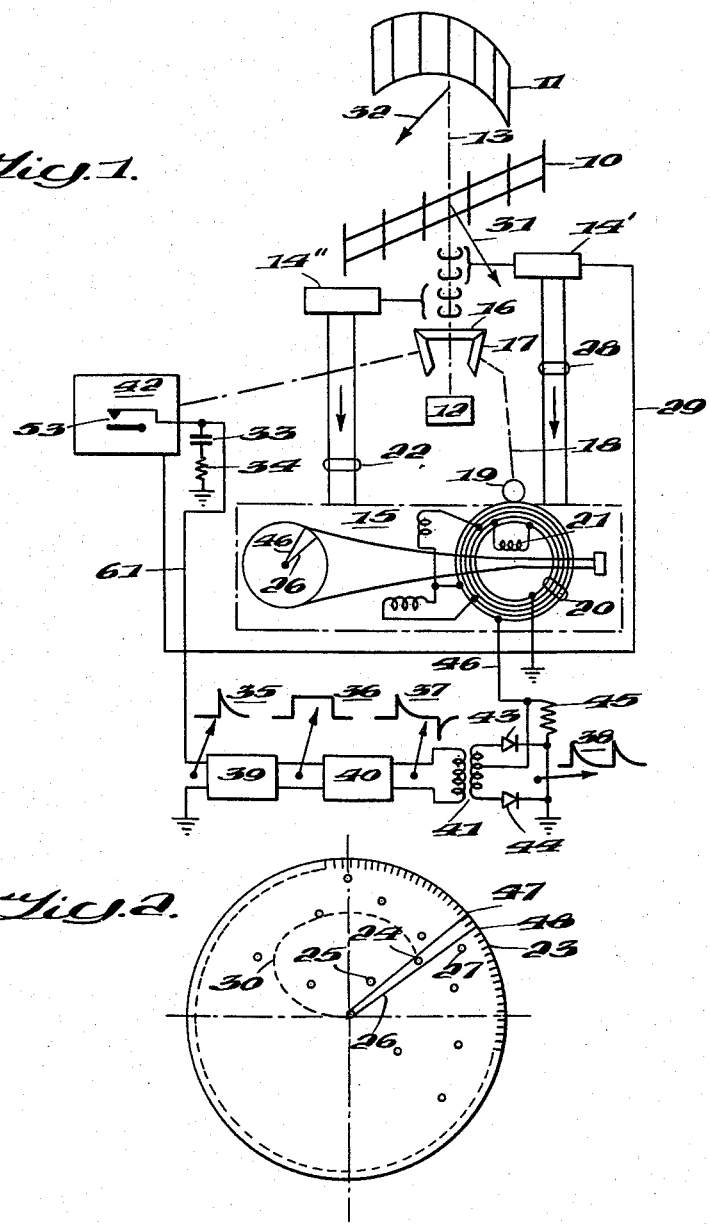

2,960,692

RADIO DIRECTION FINDING EQUIPMENT

Carl-Erik Granqvist, Tulevagen 18, Lidingo, Sweden

Original application Sept. 22, 1953, Ser. No. 381,595, now Patent No. 2,922,154, dated Jan. 19, 1960. Divided and this application Mar. 5, 1958, Ser. No. 719,318

5 Claims. (Cl. 343—6)

This is a division of application Serial No. 381,595, filed September 22, 1953, now Patent No. 2,922,154, issued January 19, 1960.

There have been proposals made for an arrangement for automatic radio direction finding, in which a directed antenna system is arranged to receive, during rotation, an input signal in the form of an indication on an indicator means, for instance a cathode ray tube, in which a field is created, rotating synchronously and in phase with the rotation of the antenna system, in order to indicate the direction of the input signal.

By means of such an arrangement a line is obtained on the indicator, for example, a cathode ray tube, which line runs from the center to the periphery of the screen and, with high degree of precision, indicates the direction to the transmitter place which is being found. It is now possible to complete such a construction with rather simple means so that it also indicates the distance to said transmitter place, the position of the transmitter place thus being distinctly indicated in a polar coordinate system.

The present invention refers to an arrangement for this purpose. According to the invention a radar equipment is connected to the direction finding construction in such a way that the rotating antenna system for the direction finding system rotates synchronously with a radar antenna, this antenna, however, being displaced from the direction finding antenna with an angle corresponding to the approximate value of the mean pulse time as defined in U.S. Patent No. 2,730,716. The input radar beam, after being received and amplified, is made to influence a deviation means in the cathode ray tube in such a way that the radial distance from the center of the indicator to the point marked by the radar beam corresponds to the distance between the receiver and the transmitter at the direction finding point.

The arrangement according to the invention is especially suitable when a number of airplanes is centrally directed and are to be supervised. When these airplanes approach an airfield, a normal radar equipment is usually arranged for picking up their pictures on a radar screen. On given occasions a rather great number of such pictures, corresponding to airplanes, may be reproduced, for instance when a whole flying squadron is approaching the same locale, and it may be very difficult for the ground command to identify the different airplanes. It might for instance occur that two or more airplanes are on the same radial bearing from the radar antenna and it is then of little use that the management gets into direction finding contact with one of these airplanes, as it is nevertheless impossible for direction purposes to identify with which of the airplanes direction finding contact has been established. This inconvenience is avoided according to the present invention.

According to one embodiment of the present invention, the arrangement is such that the bearing to the transmitter place, the direction of which has been found, is indicated by two lines, forming a narrow angle, so that objects within the angle become fully visible, when reproduced by radar, and furthermore optic interpolation becomes possible within the angle in question, while maintaining satisfactory precision.

The invention is further described below with reference to the attached drawing, showing the arrangement, indicated above, and applied and enlarged according to the present invention. Although the present invention is thereby described in connection with a special form of execution, it is of course not limited hereto, but various modifications may occur within the framework of the invention.

In the drawings, Fig. 1 shows schematically a wiring diagram of the arrangement and Fig. 2 shows a screen of a cathode ray tube.

With reference to Fig. 1 the antenna system 10 controls reception of the direction finding signal. A second antenna system 11 is arranged on the same shaft 13, which is rotated mechanically from a motor 12. The feed down conduit from the antenna systems is connected to receivers 14' and 14", respectively, which receivers are connected to a cathode ray tube 15.

A description will first be given of the operation of the system as relative to the production of an indication of the bearing to the transmitting craft, for instance an airplane. A picture of the cigar-formed direction characteristic from the antenna system 10 should thereby normally be obtained on the screen of the cathode ray tube, but the conductors 28 between the receiver 14' and the cathode ray tube 15 could be left out so that the reproduction of the direction characteristic would be suppressed. The rotation of the field in the cathode ray tube may be obtained in any arbitrary way, for instance from the shaft 13 by means of a cog gear 16—17, the latter one of said gearing wheels driving a shaft 18 which, by means of a pulley 19, rotates the deviation means of the cathode ray tube synchronously with and in a fixed angular relation to the rotation of the antenna system 10.

The same deviation means might be used for the direction finding function and for reception of the radar beam, but it is also possible to use different deviation means for these two functions. The latter is assumed to be the case in the arrangement, shown in Fig. 1. The deviation means are, however, connected to a set of contact rings 20, two of which are connected to a special deviation means 21 for transfer of pulses according to the present invention for indication of the bearing direction. For transfer of these pulses to the cathode ray tube a conductor 29 runs to a device 42 for measuring the mean pulse time, as indicated in the above-mentioned U.S. Patent No. 2,730,716, a pulse being produced by closing a contact 53 almost at the middle of the pulse which passes through the conductors 28 and the conductor 29, respectively. This pulse is transferred to the special deviation means 21 in the cathode ray tube 15 over the conductor 61 through a circuit to be described hereinafter.

Between the conductor 61 and ground a condenser 33 in series with a resistor 34 is connected. The pulse thereby acquires the form indicated by the numeral 35, shown close by the transfer conductor 61. The pulse is, over the conductor 61, transmitted to a monostable multivibrator or so called one-step multivibrator 39, in which it is transformed into a pulse of given length and of mainly rectangular form, as indicated by the curve 36. The meeting wave fronts or pulse fronts of the pulses 35 and 36 must be in a given position of time in relation to each other, and the pulse 36 must have a rather exact duration for all cases. The pulse 36 is further transferred to an electronic pulse derivator 40. Such derivators are known per se. They may for instance consist in a condenser with load resistor and an electronic tube, connected across the resistor. When the pulse 36 is transmitted to the derivator, the condenser is rapidly charged, and the voltage on the grid of the electronic tube increases, so that a sharp pulse point is obtained in its anode current, but as the charging of the condenser is gradually completed, the pulse in the anode current of the electronic tube decreases according to a rapidly falling exponential curve. When the input pulse 36 ceases, the conditions will be reversed, and, consequently, a negative pulse is obtained of essentially the same form as the positive pulse, obtained through the meeting front of the input pulse 36. The result will therefore be that two sharply marked pulses are obtained, the distance in time of which rather exactly corresponds to the length of the input pulse, the first one, for example, being positive, and the other one being negative, as shown by 37. These pulses are now rectified and they are, for this purpose, transmitted to a rectifier arrangement.

The input transformer to the push-pull coupled rectifier is indicated by 41. The secondary winding of the transformer is provided with a mid-point tap, and each winding half part is connected to a rectifier 43 or 44, respectively. These rectifiers may be of any arbitrary kind. They preferably consist in electronic tube rectifiers, but as the arrangement of such rectifiers for other purposes is well known to the man skilled in the art, they have, in the drawing, been indicated only with usual symbols. The rectifiers 43 and 44 work on a common load resistor 45, connected to the mid-point connection to the secondary winding of the transformer, over which resistor two sharp pulses, running in the same direction, are formed, as shown by the indication 38.

It is thus seen that, by means of this arrangement, a pulse doubling has taken place and that two pulses have been obtained, having essentially the same form as the original input pulse 35. The two output pulses are situated at a given distance in time from each other as well as in a given relation in time to the input pulse. The two pulses, produced in this way according to the pulse picture 38, are now transmitted to the special deviation means 21 in the cathode ray tube 15 over the conductor 56 and two of the contact rings in the set of contact rings 20. Consequently, two lines 26 and 46, respectively, are drawn on the screen of the cathode ray tube, which lines symmetrically limit the picture, according to the radar reception, of the specific airplane, the transmission of which is just then being received and the direction of which is thus being found.

The direction finding antenna 10 is picking-up a signal from a transmitter, for instance the transmitter on the airplane 24, which is situated in the direction 31 relative to the transmitter antenna 10. At another time the radar antenna 11 is picking-up the picture of the same airplane 24, although there is a displacement between the acting directions of the direction finding antenna 10 and the radar antenna 11, as indicated by the arrow 31 and 32 in the drawing. By the action of the apparatus 42, as described above, the two lines 26 and 46 are indicated as shown in Figure 2. Simultaneously, by the action of radar antenna 11 and the radar receiver 14″, signals are transmitted by means of the conductor 22 to the same cathode ray tube device 15, so that all of the airplanes in the space scanned by the radar apparatus are plotted into the radar screen as, for instance the airplanes 24, 25 and 27.

The picture, which is obtained on the cathode ray tube screen, is shown in Fig. 2. In this case, however, interpolarization has to take place between two points 47 and 48, where the lines 46 and 26 hit the scale 23 of the cathode ray tube, in order that one shall find the correct bearing on to the airplane 24. Such interpolarization between the values read off is also easy to perform as the two lines are straight. If the relation in the counter is properly adjusted, then the airplane, the direction of which has been found, shall be in the center of the bisectrix of the angle, formed by the two lines 26 and 46. Due to this situation it is as a rule easy to distinguish the airplane 24 from adjacent airplanes, for instance the airplanes 25 and 27, as it must be remembered that the airplanes do not follow exactly parallel courses nor are they situated at the same height. The three airplanes in question 25, 24 and 27 have therefore moved in the field within a very short period of time but only one of these, viz. the airplane 24, remains for good within the bisectrix between the two lines 26 and 46 while following its path 30. This is quite enough for making it possible to identify with accuracy the airplane 24 as the airplane of which the direction has been found.

If the two antennae 10 and 11 are not, as shown in the figure, arranged on a common shaft, it is in any case suitable that they rotate synchronously and in a given angular position in relation to each other, for instance by being brought to rotate by means of shafts, mutually mechanically or electrically connected.

It is, however, possible to let the two antenna systems rotate without such mutual time connection, if instead a pulse accumulator is arranged in which the direction finding pulse is received and then released in the form of a pulse, corresponding to the pulse 35, when the radar equipment responds to the same object. The arrangements for this purpose do not form part of the present invention, but the invention is not, on the other hand, limited to such an arrangement, in which the two antenna systems rotate synchronously and in fixed angular relation, but other measures may be taken for insuring proper relation between the indication of the direction finding arrangement and the indication of the radar equipment on the radar screen.

I claim:

1. A system for correlating intelligence from radar and direction finding equipments including synchronously operating antennas and for recording the intelligence on a single cathode ray tube comprising means for doubling a single pulse produced by the direction finding equipment indicating the bearing of an object, means for producing on the cathode ray tube radial lines in response to the input of the doubled pulse, and means for producing a trace between the radial lines of the radar impulse of the object.

2. A system according to claim 1 wherein said pulse doubling means includes means for providing two pulses in predetermined time delay relation.

3. A system according to claim 1 said pulse doubling means including a monostable multivibrator to elongate the pulse to a given length and a pulse derivator connected to the output circuit of the multivibrator for providing a first pulse at the beginning of the elongated pulse and a second pulse at the end of the elongated pulse.

4. A system according to claim 3 said pulse doubling means including a push-pull rectifier connected to the output of the pulse derivator for giving said first and second pulses the same polarity.

5. A system according to claim 3, said pulse doubling means including a rectifier connected to the output of the pulse derivator for giving said first and second pulses the same polarity, said rectifier comprising a transformer having a mid-point tap on the secondary, and two rectifiers each connected over half of the secondary and coupled to a common load resistor.

References Cited in the file of this patent

UNITED STATES PATENTS 2,654,085    Goldstein _____ Sept. 29, 1953